United States Patent
Durach et al.

(10) Patent No.: US 7,255,161 B2
(45) Date of Patent: Aug. 14, 2007

(54) METHOD OF CONTROLLING A HEATING AND AIR CONDITIONING SYSTEM IN A MOTOR VEHICLE

(75) Inventors: Stephan Durach, Munich (DE); Danny Borke, Munich (DE); Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 248 days.

(21) Appl. No.: 10/784,253

(22) Filed: Feb. 24, 2004

(65) Prior Publication Data

US 2004/0194945 A1    Oct. 7, 2004

(30) Foreign Application Priority Data

Feb. 27, 2003   (DE) ................ 103 08 413

(51) Int. Cl.
*B60H 1/00* (2006.01)
(52) U.S. Cl. .............. 165/202; 165/203; 62/244; 62/176.6
(58) Field of Classification Search ......... 165/202, 165/203, 204; 454/75; 62/176.6, 249; 701/36, 701/49
See application file for complete search history.

(56) References Cited

U.S. PATENT DOCUMENTS 4,881,456 A * 11/1989 Yasuda et al. .......... 454/75
5,081,586 A * 1/1992 Barthel et al. .......... 701/49
6,454,178 B1 * 9/2002 Fusco et al. .......... 165/203
6,679,075 B2 * 1/2004 Kampf et al. .......... 62/176.6

FOREIGN PATENT DOCUMENTS

| DE | 19526450 C1 | 5/1996 |
| DE | 19811967 A1 | 9/1999 |
| DE | 19900735 A1 | 7/2000 |
| DE | 10013165 A1 | 10/2001 |

OTHER PUBLICATIONS

German Search Report.
VDI-Berichte 515, Elektronik im Kraftfahrzeug [Reports of the German Society of Engineers 515, Electronics in the Motor Vehicle] by the VDI Publishing Company.

* cited by examiner

*Primary Examiner*—Ljiljana Ciric
(74) *Attorney, Agent, or Firm*—Crowell & Moring LLP

(57) ABSTRACT

A method for controlling a heating and air conditioning system equipped with actuators, preferably vents, is provided. Interior conditions are detected by an interior sensing system, with at least the seat occupancy with occupants being automatically recognized by an object recognition system on the basis of the data supplied by the interior sensing system. An optimized adjustment of the heating and air conditioning system to the seat occupancy is automatically performed as a function of the recognized seat occupancy.

6 Claims, No Drawings

METHOD OF CONTROLLING A HEATING AND AIR CONDITIONING SYSTEM IN A MOTOR VEHICLE

This application claims the priority of German application DE 103 08 413.4-16, filed Feb. 27, 2003, the disclosure of which is expressly incorporated by reference herein.

BACKGROUND AND SUMMARY OF THE INVENTION

This invention relates to a method of controlling a heating and air conditioning system in a motor vehicle.

There are known methods and systems in which it is possible to make a personalized adjustment of the temperature and fan settings.

For example, BMW vehicles have a function which is known as key memory which makes it possible to make various personalized individual settings. For example, settings for the fan and temperature can be stored on a vehicle key. When the ignition is turned on, the presettings are transferred from the key to the vehicle.

In addition, there are known heating and air conditioning systems in which manual adjustments of the fan setting, air distribution and air temperature can be performed individually for each occupant of the vehicle according to his or her needs by means of actuators. The air distribution is controlled, for example, by varying the vent outlets for the foot space and/or head space, and the air temperature setting can be performed by motor actuators or mixing valves. Such controls and settings are known, for example, from the book "VDI-Berichte 515, Elektronik im Kraftfahrzeug" [Reports of the German Society of Engineers 515, Electronics in the Motor Vehicle] by the VDI Publishing Company.

The object of this invention is to improve upon the known methods of controlling a heating and air conditioning system.

This object is achieved according to this invention by controlling a heating and air conditioning system with actuators, preferably vents, whereby interior conditions are detected by an interior sensing system, in which at least the occupancy of seats with passengers is automatically detected by an object detection system on the basis of the data supplied by the interior sensing system and an optimized adjustment of the heating and air conditioning system to the seat occupancy is performed automatically for all occupants of the vehicle by a control unit as a function of seat occupancy.

The new statutory regulation with regard to airbag systems in the United States (FMVSS208 of NHTSA) creates the need for an interior sensing system for determination of seat occupancy and the position of the passenger's head. For several premium class automobiles, an interior camera system, usually a 3D camera system, is provided for this purpose. It is advantageous to also use this pre-existing camera system to control an audio system. This eliminates any additional cost for the camera system for the manufacturer of the automobile.

DETAILED DESCRIPTION

With the inventive method, the vehicle occupants need not themselves attempt an optimum setting of the fan and the air temperature, for example, as well as economical operation of the heating and air conditioning system. If there is a change in the seat occupancy in the vehicle which is recognized by the interior camera system and the object recognition system, the settings of the heating and air conditioning system are adjusted by the control unit, e.g., from the standpoint of improved comfort and economical operation of the heating and air conditioning system. The actuators, such as vents, are opened further, for example, to increase the flow in the vehicle. A change in the air distribution can also be performed by changing the vent outlet. A change in air temperature may be accomplished in a known way, e.g., by motor actuators or mixing valves.

The interior sensing and object recognition system and control unit may be installed separately in a joint control device or together with other systems.

An advantageous refinement is provided by the inventive method if the actuators of the heating and air conditioning system are triggered so that the fan strength and/or air distribution is/are altered in the direction of a seat if that seat is no longer occupied by a passenger. If a passenger would like full fan intensity, for example, he or she will adjust the vents for the foot space and/or head space, for example, so that the fan blows strongly there. If that passenger later leaves the vehicle, the actuators for the fan will automatically change position so that the discharge of fan air in the direction of the previously occupied seat in the interior of the vehicle is reduced or cut off entirely. Therefore, nearby passengers who do not desire such fan intensity are no longer unnecessarily disturbed by the noise of the fan, and the cooling power may even be distributed more efficiently.

It is also advantageous if, according to this invention, the actuators for the heating and air conditioning system are triggered in the case of heating in the area of a seat, so that the temperature in the area of a seat which is not occupied by a passenger is adapted to the other temperature settings in the vehicle. The adjustment of the temperature by the vehicle interior climate control system as well as by the seat climate control system likewise improve comfort in the vehicle.

It is also advantageous if, as an alternative, the actuators of the heating and air conditioning system in the case of cooling are triggered in the area of a seat so that the temperature in the area of a seat not occupied by a passenger is increased. Therefore, energy losses from the heating and air conditioning system can be prevented.

It is especially advantageous if, by means of the object recognition system, the position of the head of each passenger is calculated and an optimized setting of the heating and air conditioning system is performed by means of the control unit as a function of the seat occupancy and head position for each occupant automatically by means of actuators.

Different settings are possible for the fan, such as air stream toward the face, air stream around the face, air stream away from the face, etc. These settings are implemented by the actuators provided for this purpose. The instantaneous head position is calculated by means of an interior camera system and object recognition system. If the occupant changes his head position, the fan is adjusted to the new head position by means of the actuators via the control unit so that the passenger retains his or her desired fan setting.

It is also possible by means of the interior camera and object recognition system to identify the various occupants, preferably the driver of the vehicle, in a known way and/or differentiate them from others, so that a prestored heating and air conditioning fan setting is automatically retrieved as a function of the person thereby identified. Then the fine setting is made as a function of the head position and the varying seat occupancy according to the inventive refinement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of controlling a vehicle interior heating and air conditioning system equipped with actuators, comprising the acts of:
    detecting interior conditions with an interior sensing system;
    automatically detecting seat occupancy with an object recognition system on the basis of data received from the interior sensing system; and
    adjusting automatically the heating and air conditioning system actuators as a function of seat occupancy to maintain desired interior conditions at at least one of a plurality of seats within the vehicle interior,
    wherein
    in the step of detecting seat occupancy, a head position is calculated by the object recognition system for at least one occupant, and
    in the adjusting step, an optimized setting of the heating and air conditioning system for each detected occupant is automatically performed by actuators as a function of seat occupancy and head position.

2. The method of claim 1, wherein
    in the adjusting step, if one of the plurality of seats is unoccupied by a passenger, the actuators of the heating and air conditioning system are operated so that one of a fan intensity and an air distribution in the direction of the unoccupied one of the plurality of seats is adjusted.

3. The method of claim 2, wherein
    in the adjusting step, the actuators of the heating and air conditioning system are operated so that a temperature in an area of an unoccupied one of the plurality of seats is adjusted toward the desired interior conditions.

4. The method of claim 2, wherein
    in the adjusting step, the actuators of the heating and air conditioning system are operated during interior cooling so that a temperature at an unoccupied one of the plurality of seats is permitted to increase to reduce heating and air conditioning system energy usage.

5. The method of claim 1, wherein
    in the adjusting step, the actuators of the heating and air conditioning system are operated so that a temperature at an unoccupied one of the plurality of seats is adjusted toward the desired interior conditions.

6. The method of claim 1, wherein
    in the adjusting step, the actuators of the heating and air conditioning system are operated during interior cooling so that a temperature at an unoccupied one of the plurality of seats is permitted to increase to reduce heating and air conditioning system energy usage.

* * * * *